Patented Dec. 19, 1939

2,183,552

UNITED STATES PATENT OFFICE 2,183,552

ALKYLATED POLY-ISOPROPYL HALO-BENZENES

Robert R. Dreisbach and George Beal Heusted, Midland, Mich., assignors to The Dow Chemical Company, Midland, Mich., a corporation of Michigan No Drawing. Application March 15, 1937, Serial No. 130,895

2 Claims. (Cl. 260—650)

This invention concerns certain new organic products consisting essentially of alkylated polyisopropylbenzene derivatives having the generic formula:

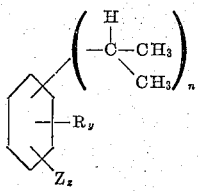

wherein R is an alkyl group other than the isopropyl group, Z is hydrogen or a halogen, $n$ is an integer not less than 3 nor more than 4, and $y$ and $z$ are integers not greater than 2 and the sum of which is not greater than 3. Such compounds are hereinafter referred to as "alkylated polyisopropylbenzenes". The products are in most instances liquid mixtures of isomeric compounds having the above generic formula, although individual compounds may in some instances be obtained. All of the products are useful as organic solvents and as dielectric agents. Certain of them are adapted to special uses, e. g. as agents for incorporation in motor fuels, such as gasoline containing lead tetraethyl, to increase the octane rating thereof.

Our new products may be prepared by reacting benzene or a halobenzene containing not more than two halogen atoms per molecule successively with propylene and another olefin in the presence of a Friedel-Crafts catalyst, or by similar procedure using an isopropyl halide and another alkyl halide as the alkylating agents. Our new products may likewise be produced by reacting a mono- or di-alkylbenzene with propylene or an isopropyl halide. The alkylated polyisopropylbenzenes containing halogen may, in addition, be prepared by nuclear halogenation of the corresponding hydrocarbons.

According to one procedure benzene or a halobenzene containing not more than two halogen atoms per molecule and between 0.03 and 0.15 molecular equivalent of aluminum chloride or other Friedel-Crafts catalyst, are placed in a closed reactor provided with an agitator. Propylene is then passed into the reactor at approximately room temperature, while stirring the reaction mixture and maintaining the same under a moderate pressure, e. g. up to 100 pounds per square inch gauge. Operation in such manner is continued until three or more equivalents of propylene per mole of benzene compound have been added, the exact amount depending upon which product is desired. Introduction of propylene is then discontinued and another olefin, e. g. ethylene, is introduced into the mixture under the conditions stated above until the desired degree of alkylation is reached. Addition of olefin is then stopped and the mixture is allowed to stand for some time, e. g. 0.5 hour or longer, during which time a heavy sludge layer containing the catalyst usually settles to the bottom of the reactor. This heavy layer is drawn off for re-employment as a catalyst in subsequent reactions, and the clear supernatant liquid is washed with water, neutralized with an aqueous alkali, dried, and fractionally distilled to separate the alkylated polyisopropyl-benzene product. This product is usually a water-white liquid mixture of isomeric compounds having properties so similar that separation of the individual substances is extremely difficult, if not impossible.

In making our new compositions, the corresponding alkyl halide may be substituted for olefin as alkylating agent without otherwise altering the procedure disclosed above.

Alkylated polyisopropyl-benzene products containing not more than five susbtituted hydrocarbon groups per molecule may be reacted with chlorine or bromine at moderate temperatures, e. g. temperatures not exceeding 50° C., in the presence of iron and in the dark to obtain corresponding mixtures of alkylated polyisopropyl-halobenzenes. Such nuclear-halogenated products are particularly useful as dielectric agents.

The following examples illustrate a number of ways in which the principle of our invention has been employed, but are not to be construed as limiting the invention:

Example 1

A mixture of 20 pounds of toluene, 4.42 pounds of aluminum chloride, and 0.35 pound of crude aluminum chloride catalyst recovered from a previous reaction was placed in a closed reactor provided with a mechanical stirrer. While maintaining such mixture at a temperature of 20°–30° C., 27.0 pounds of propylene was gradually introduced with agitation at a pressure of about 20 pounds per square inch gauge. When addition of propylene was complete the mixture was permitted to settle, and the sludge layer was removed. The remaining material was washed successively with water and aqueous alkali, dried, and fractionally distilled, the fraction distilling at a temperature between 250° and 253° C. at atmospheric pressure being collected. This 250°–253° C. fraction was redistilled, whereby 37.8 pounds of a water-white liquid mixture of isomeric triisopropyl-toluenes having a boiling point of about 250.9° C. at 739 millimeters' pressure and a specific gravity of about 0.8661 25°/25° C. was separated. Additional properties of this triisopropyltoluene product are given in Table I.

*Example 2*

A mixture of 2560 grams of ethyl-isopropyl-benzene, 3518 grams of ethyl-diisopropyl-benzene, both compounds being prepared by the reaction of propylene with ethyl benzene, and 454 grams of aluminum chloride was treated at approximately 25° C. with 2438 grams of propylene, the procedure being similar to that employed in Example 1. The mixture was then allowed to settle, the sludge layer was drawn off, and the supernatant layer was washed with water, neutralized, dried, and fractionally distilled, the fractions distilling at temperatures between 250° and 258° C. and between 258° and 259° C. at atmospheric pressure being collected. The 250°–258° C. fraction was redistilled, whereby 3600 grams of a water-white liquid mixture of isomeric monoethyl-triisopropyl-benzenes having a boiling point of about 254.3°–257.3° C. at 746 millimeters' pressure and a specific gravity of about 0.8656 25°/25° C. was separated. The 258°–259° C. fraction from the original distillation was redistilled and subsequently cooled, whereby 68 grams of a crystalline monoethyl-triisopropyl-benzene having a melting point of about 106.9° C. and a boiling point of about 259.7° C. at 750 millimeters' pressure, was recovered. Additional properties of these monoethyl-triisopropyl-benzene products are given in Table I.

*Example 3*

A mixture of 438 grams of the triisopropyl-toluene product prepared as in Example 1 and 15 grams of iron filings was stirred and maintained at a temperature between about 15° and 20° C. while 102 grams of chlorine was gradually passed thereinto. The chlorination product was washed with water, dried, and fractionally distilled at a pressure of 10 millimeters of mercury, the fraction distilling at a temperature between 129° and 132° C. being collected. This material was redistilled, whereby 149 grams of a water-white liquid mixture of isomeric triisopropyl-monochlortoluenes having a boiling point of about 283° C. at 753 millimeters' pressure and a specific gravity of about 0.9794 25°/25° C. was separated. Additional properties of this product are given in Table I.

Table I lists the new alkylated polyisopropyl-benzene products prepared in accordance with our invention and gives properties of each.

*Table I*

| No. | Product | Formula | Boiling point ° C. | Freezing point ° C. | Specific gravity 25°/25° C. | Specific gravity 100°/100° F. | Refractive index 25° C. | Latent heat of evaporation Cals./gm. |
|---|---|---|---|---|---|---|---|---|
| 1 | Triisopropyl toluene | $C_{15}H_{26}$ | 248°–253° at 739 mm | Stiff at −35° | .8661 | .8596 | 1.4928 | 52.2 |
| 2 | Triisopropyl xylene | $C_{17}H_{28}$ | 275.6° at 748 mm | Stiff at −25° | .8896 | .884 | 1.5085 | 51.2 |
| 3 | Triisopropyl ethyl benzene | $C_{17}H_{28}$ | 254.3°–257.3° at 746 mm | Stiff at −35° | .86555 | .860 | 1.4961 | 49.2 |
| 4 | Triisopropyl ethyl benzene (isomer) | $C_{17}H_{28}$ | 259.7° at 750 mm | 106.9 | | | | 49.6 |
| 5 | Triisopropyl diethyl benzene | $C_{19}H_{32}$ | 277°–279° at 735 mm | Stiff at −65° | .8812 | .875 | 1.5031 | 46.0 |
| 6 | Tetraisopropyl toluene | $C_{19}H_{32}$ | 270° at 741 mm | Stiff at +10° | .90857 | .9019 | 1.5103 | 45.4 |
| 7 | Triisopropyl monochlor toluene | $C_{15}H_{25}Cl$ | 283° at 753 mm | Stiff at +15° | .9794 | | 1.5128 | 47.7 |
| 8 | Triisopropyl monobrom toluene | $C_{15}H_{25}Br$ | 296° at 740 mm | Stiff at −10° | 1.1466 | | 1.5331 | 43.6 |

| No. | Product | Coefficient of expansion ×10⁻³ | Viscosity at 50° F. Millipoises | Viscosity at 100° F. Millipoises | Viscosity at 180° F. Millipoises | Dielectric constant | Dielectric strength volts per 0.1 inch | Resistivity | Flash point °C | Fire point °C |
|---|---|---|---|---|---|---|---|---|---|---|
| 1 | Triisopropyl toluene | .975 | 116.4 | 44.2 | 16.17 | 2.16 | 21,250 | Inf. at 60° C. | | |
| 2 | Triisopropyl xylene | .7855 | 542.0 | 105.8 | 31.3 | | | | | |
| 3 | Triisopropyl ethyl benzene | .9988 | 193.3 | 58.5 | 19.1 | 2.12 | | Inf. at 100° C. | 109 | 119 |
| 4 | Triisopropyl ethyl benzene (isomer) | | | | | | | | | |
| 5 | Triisopropyl diethyl benzene | .885 | | 564.2 | 43.9 | 2.14 | | Inf. at 100° C. | | |
| 6 | Tetraisopropyl toluene | .693 | | 610.0 | 55.65 | 2.26 | 10,500 | Inf. at 60° C. | 133 | 144 |
| 7 | Triisopropyl monochlor toluene | | | | | | | | | |
| 8 | Triisopropyl monobrom toluene | .655 | 2,073.0 | 238.6 | 44.2 | | | | | |

Other modes of applying the principle of our invention may be employed, change being made as regards the method or products herein disclosed provided the products stated by the following claims or the equivalent of such stated products be employed.

We, therefore, particularly point out and distinctly claim as our invention:

1. A liquid alkylated polyisopropyl-halobenzene useful as a dielectric agent and having the generic formula:

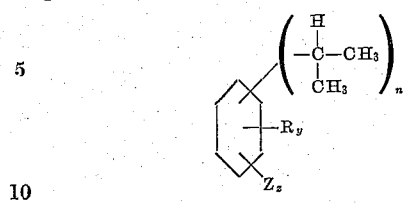

wherein R is an alkyl group other than the isopropyl group, Z is a halogen, $n$ is an integer not less than 3 nor more than 4, and $y$ and $z$ are integers not greater than 2 and the sum of which is not greater than 3.

2. A liquid mixture of monomethyl-triisopropyl-monochlorbenzenes having a boiling point of about 283° C. at 753 millimeters' pressure and a specific gravity of about 0.980.

ROBERT R. DREISBACH.
GEORGE BEAL HEUSTED.